US009823973B1

(12) United States Patent
Natanzon

(10) Patent No.: US 9,823,973 B1
(45) Date of Patent: Nov. 21, 2017

(54) CREATING CONSISTENT SNAPSHOTS IN A VIRTUALIZED ENVIRONMENT

(71) Applicant: EMC Corporation, Hopkinton, MA (US)

(72) Inventor: Assaf Natanzon, Tel-Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/578,663

(22) Filed: Dec. 22, 2014

(51) Int. Cl.
G06F 12/00 (2006.01)
G06F 11/14 (2006.01)
G06F 3/06 (2006.01)

(52) U.S. Cl.
CPC .......... *G06F 11/1446* (2013.01); *G06F 3/065* (2013.01); *G06F 3/0619* (2013.01); *G06F 3/0665* (2013.01); *G06F 3/0689* (2013.01); *G06F 2201/84* (2013.01); *G06F 2212/262* (2013.01)

(58) Field of Classification Search
CPC ............. G06F 11/1446; G06F 2201/84; G06F 3/0689; G06F 3/0619; G06F 3/0665; G06F 3/065
See application file for complete search history.

(56) References Cited

U.S. PATENT DOCUMENTS 6,792,518 B2 9/2004 Armangau et al.
7,054,883 B2 5/2006 Meiri et al.
7,266,706 B2 9/2007 Brown et al.
7,340,489 B2 3/2008 Vishlitzky et al.
7,475,207 B2 * 1/2009 Bromling ............ G06F 11/2064 709/214
7,558,926 B1 7/2009 Oliveira et al.
7,577,722 B1 8/2009 Khandekar et al.
7,613,890 B1 11/2009 Meiri
7,840,595 B1 11/2010 Blitzer et al.
7,975,018 B2 7/2011 Unrau et al.
8,046,545 B2 10/2011 Meiri et al.
(Continued)

OTHER PUBLICATIONS

EMC Corporation, "EMC RecoverPoint CDP: Continuous Data Protection for Operational Recovery, Applied Technology," White paper H6181.2, Feb. 2011, 22 pp.
(Continued)

*Primary Examiner* — David X Yi
*Assistant Examiner* — Alan Otto
(74) *Attorney, Agent, or Firm* — Muirhead and Saturnelli, LLC

(57) ABSTRACT

The described system provides that backend array-based snapshots may be created separately on each site of a cluster, and then the snapshots fixed so as to be consistent and/or otherwise identical among the plurality of sites. The system advantageously allows creation of a consistent cluster-wide snapshot with minimal or no I/O delays. In an embodiment, the system provides for use of a change tracker that tracks the metadata of all the I/Os incoming to the volumes being snapped. When the system wants to create a snapshot on all sites, the change tracker is activated on each site separately for the volumes being snapped. A snapshot is then created on each of the cluster sites/backend storage arrays separately. The change trackers are then ordered to stop tracking. A snapshot fixing procedure is then initiated.

20 Claims, 12 Drawing Sheets

(56) References Cited

U.S. PATENT DOCUMENTS

| | | |
|---|---|---|
| 8,335,899 B1 | 12/2012 | Meiri et al. |
| 8,667,490 B1 | 3/2014 | van der Goot |
| 8,682,852 B1 | 3/2014 | Salamon et al. |
| 2004/0250030 A1* | 12/2004 | Ji .......................... G06F 3/0613 |
| | | 711/162 |

OTHER PUBLICATIONS

EMC Corporation, "Improving VMware Disaster Recovery with EMC RecoverPoint," White paper H2352.1, May 2008, 17 pp.
EMC Corporation, "EMC ViPR: Version 1.1.0," Concepts Guide, Feb. 2014, 42 pp.
U.S. Appl. No. 13/340,958, filed Dec. 30, 2011, Nickurak et al.
U.S. Appl. No. 13/741,644, filed Jan. 15, 2013, Salamon et al.

* cited by examiner

CREATING CONSISTENT SNAPSHOTS IN A VIRTUALIZED ENVIRONMENT

TECHNICAL FIELD

This application is related to the field of data storage and, particularly, to systems for managing data and resources in a virtualized environment.

BACKGROUND OF THE INVENTION

In current storage networks, and particularly storage networks including geographically distributed directors (or nodes) and storage resources, preserving or reducing bandwidth between resources and directors while providing optimized data availability and access is highly desirable. Data access may be localized, in part, to improve access speed to pages requested by host devices. Caching pages at directors provides localization, however, it is desirable that the cached data be kept coherent with respect to modifications at other directors that may be caching the same data. An example of a system for providing distributed cache coherence is described in U.S. Pat. No. 7,975,018 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

Data transfer among storage devices, including transfers for data replication or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Particularly for asynchronous transfers, it is desirable to maintain a proper ordering of writes such that any errors or failures that occur during data transfer may be properly identified and addressed such that, for example, incomplete data writes be reversed or rolled back to a consistent data state as necessary.

Reference is made, for example, to U.S. Pat. No. 7,475,207 to Bromling et al. entitled "Maintaining Write Order Fidelity on a Multi-Writer System," which is incorporated herein by reference, that discusses features for maintaining write order fidelity (WOF) in an active/active system in which a plurality of directors (i.e. controllers and/or access nodes) at geographically separate sites can concurrently read and/or write data in a distributed data system. Discussions of data ordering techniques for synchronous and asynchronous data replication processing for other types of systems, including types of remote data facility (RDF) systems produced by EMC Corporation of Hopkinton, Mass., may be found, for example, in U.S. Pat. No. 7,613,890 to Meiri, entitled "Consistent Replication Across Multiple Storage Devices," U.S. Pat. No. 7,054,883 to Meiri et al., entitled "Virtual Ordered Writes for Multiple Storage Devices," and U.S. Pat. No. 8,335,899 to Meiri et al., entitled "Active/Active Remote Synchronous Mirroring," which are all incorporated herein by reference.

In some instances, it is desirable to provide a point-in-time image of a logical volume. An example of a logical point-in-time image of the volume may be a data storage snapshot copy that may be obtained relatively quickly and without significant overhead by creating a data structure initially containing pointers that point to sections of the logical volume. A data storage snapshot does not replicate a full copy of the data set (referred to as a production data set). Rather, the data storage snapshot only stores differences between a current version of the production data set and the version of the data set at the point in time when the snapshot was taken. There are many different specific mechanisms for providing snapshot copies, see, for example, U.S. Pat. No. 7,340,489 to Vishlitzky, et al., entitled "Virtual Storage Devices," and U.S. Pat. No. 6,792,518 to Armangau et al., entitled "Data Storage System Having Mata [Meta] Bit Maps for Indicating Whether Data Blocks are Invalid in Snapshot Copies," which are both incorporated by reference herein. It is noted that although the term "snapshot" is principally used herein, the system described herein applies to any appropriate point-in-time image.

In a virtualized environment, a centralized management infrastructure, that may be referred to as a virtual center, may provide a central point of control for managing, monitoring, provisioning and migrating virtual machines. A virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The virtual center may operate to control virtual machines in data centers and, for example, in connection with cloud computing. The virtual center may further include a virtual data center that provides logical control and management of data storage in a data center, and provides for sub-dividing contents of virtual components into compute resources, network resources and storage resources.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM image may be a point-in-time image or snapshot of the state of the virtual machine as it resides in the host's memory. The VM image may be obtained for an operating VM and transferred to another location where the VM continues execution from the state defined by the virtual machine image. In this way, the VM image may be a snapshot (a VM snapshot) of an execution state of a program by a VM that may be moved between different locations and processing thereafter continued without interruption. Reference is made to U.S. Pat. No. 8,667,490 B1 to van der Goot, entitled "Active/Active Storage and Virtual Machine Mobility Over Asynchronous Distances," which is incorporated herein by reference.

Continuous snapshotting (CS) refers to a process of taking snapshots of any content change in a storage system. In connection with the content being user data, the process may be referred to as continuous data protection (CDP). In a CS/CDP implementation, individual writes to storage are duplicated and stored in a log of activity in one or more journal devices. By replaying these writes in reverse, storage may be "rolled back" (a roll-back) to any past state which was covered by the logs. This may be done on production storage, or in a duplicate copy of the storage to avoid disruption to users of the production storage. In the latter case, when access to historic data is no longer required, the log may be replayed again in forward order (a roll-forward) to restore the duplicate to the production state and possibly including logged writes that occurred since roll-back. An example of a product that provides continuous data protection with multiple recovery points to restore applications instantly to a specific point in time is RecoverPoint by EMC Corporation of Hopkinton, Mass.

Content protected by point-in-time images, such as snapshots, e.g. in connection with continuous snapshotting techniques, may be extended to include not only user data but further include configuration metadata, and/or other appropriate configuration information of the state of an associated VM (VM snapshots). The VM snapshots may include information used for configuration volumes, storage devices, consistency groups and/or other appropriate storage management system elements, as further discussed elsewhere herein. A user may want to roll-back a storage management system to a past state of a VM due to performance or stability issues attributed to configuration changes.

For further discussion of techniques for providing continuous data protection, reference is made, for example, to U.S. Pat. No. 8,046,545 to Meiri et al., entitled "Continuous Backup," which discloses a system for providing continuous backup of a storage device and restoring the storage device to prior states; U.S. Pat. No. 7,558,926 to Oliveira et al., entitled "Continuous Data Backup Using Distributed Journaling," which discloses techniques for providing continuous data backups of primary storage using distributed journals; and U.S. Pat. No. 7,840,595 to Blitzer et al., entitled "Techniques for Determining An Implemented Data Protection Policy," which discloses features of determining a data protection method in accordance with a facility and replication type associated with each of one or more selected recovery points of one or more storage objects. The above-noted references are incorporated herein by reference.

Users of storage management systems may make use of snapshot products, and/or other point-in-time data copy products, to establish a line of "history" for all the user data that flows through the system and/or for VM snapshots for past states of one or more associated VMs. Among multiple storage sites, it may be advantageous to have consistent snapshots across the multiple sites. Techniques may be provided for consistent snapshots that include creating a snapshot only on one site of the cluster and/or suspending I/Os on all the sites of the cluster and creating snapshots simultaneously on all the storage arrays. These techniques, however, may suffer certain disadvantages in terms of timeliness of snapshot consistency and/or in delays of system operations.

Accordingly, it would be desirable to provide a system that addresses the above-noted problems and efficiently and effectively provides for creating consistent cluster-wide snapshots in a virtualized environment.

SUMMARY OF THE INVENTION

According to the system described herein, a method for providing a consistent point-in-time copy of data includes tracking information of input/outputs (I/Os) of data on each site of a plurality of sites each having at least one storage array. Point-in-time copies of the data are created separately at each site of the plurality of sites. The point-in-time copies of the data are fixed to provide the consistent point-in-time copy of the data among the plurality of sites. The information of the I/Os may be metadata of the I/Os. Fixing the point-in-time copies of the data may includes: stopping the tracking of the information of the I/Os; determining one of the plurality of sites as a target site; merging the tracked information of the I/Os from each of the plurality of sites into the target site to create a list of changes at the target site; and modifying the point-in-time copy at the target site using the list of changes to provide the consistent point-in-time copy of data among the plurality of sites. The information of the I/Os may be tracked using at least one change tracker for the plurality of sites, and the at least one change tracker may include separate change trackers at each site of the plurality of sites. After modifying the point-in-time copy at the target site, the at least one change tracker may be erased for the plurality of sites. After erasing the at least one change tracker, the at least one change tracker may be restarted to track information of further I/Os at each site. Before creating the point-in-time copies separately at each site, open I/Os may be flushed at each of the sites.

According further to the system described herein, a non-transitory computer-readable medium stores software for providing a consistent point-in-time copy of data. The software includes executable code that tracks information of input/outputs (I/Os) of data on each site of a plurality of sites each having at least one storage array. Executable code is provided that creates point-in-time copies of the data separately at each site of the plurality of sites. Executable code is provided that fixes the point-in-time copies of the data to provide the consistent point-in-time copy of the data among the plurality of sites. The information of the I/Os may be metadata of the I/Os. The executable code that fixes the point-in-time copies may include: executable code that stops the tracking of the information of the I/Os; executable code that determines one of the plurality of sites as a target site; executable code that merges the tracked information of the I/Os from each of the plurality of sites into the target site to create a list of changes at the target site; and executable code that modifies the point-in-time copy at the target site using the list of changes to provide the consistent point-in-time copy of data among the plurality of sites. The information of the I/Os may be tracked using at least one change tracker for the plurality of sites, and the at least one change tracker may include separate change trackers at each site of the plurality of sites. Executable code may be provided that, after the point-in-time copy is modified at the target site, erases the change tracker at each site of the plurality of sites. Executable code may be provided that, after the change tracker is erased at each site, restarts the change tracker at each site to track information of further I/Os at each site. Executable code may be provided that, before the point-in-time copies are created separately at each site, flushes open I/Os at each of the sites.

A system includes a plurality of sites having storage arrays and a non-transitory computer-readable medium storing software for providing a consistent point-in-time copy of data. The software includes executable code that tracks information of input/outputs (I/Os) of data on each site of a plurality of sites each having at least one storage array. Executable code is provided that creates point-in-time copies of the data separately at each site of the plurality of sites. Executable code is provided that fixes the point-in-time copies of the data to provide the consistent point-in-time copy of the data among the plurality of sites. The information of the I/Os may be metadata of the I/Os. The executable code that fixes the point-in-time copies may include: executable code that stops the tracking of the information of the I/Os; executable code that determines one of the plurality of sites as a target site; executable code that merges the tracked information of the I/Os from each of the plurality of sites into the target site to create a list of changes at the target site; and executable code that modifies the point-in-time copy at the target site using the list of changes to provide the consistent point-in-time copy of data among the plurality of sites. The information of the I/Os may be tracked using at least one change tracker for the plurality of sites, and the at least one change tracker may include separate change trackers at each site of the plurality of sites. Executable code may be provided that, after the point-in-time copy is modified at the target site, erases the change tracker at each site of the plurality of sites. Executable code may be provided that, after the change tracker is erased at each site, restarts the change tracker at each site to track information of further I/Os at each site. Executable code may be provided that, before the point-in-time copies are created separately at each site, flushes open I/Os at each of the sites.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
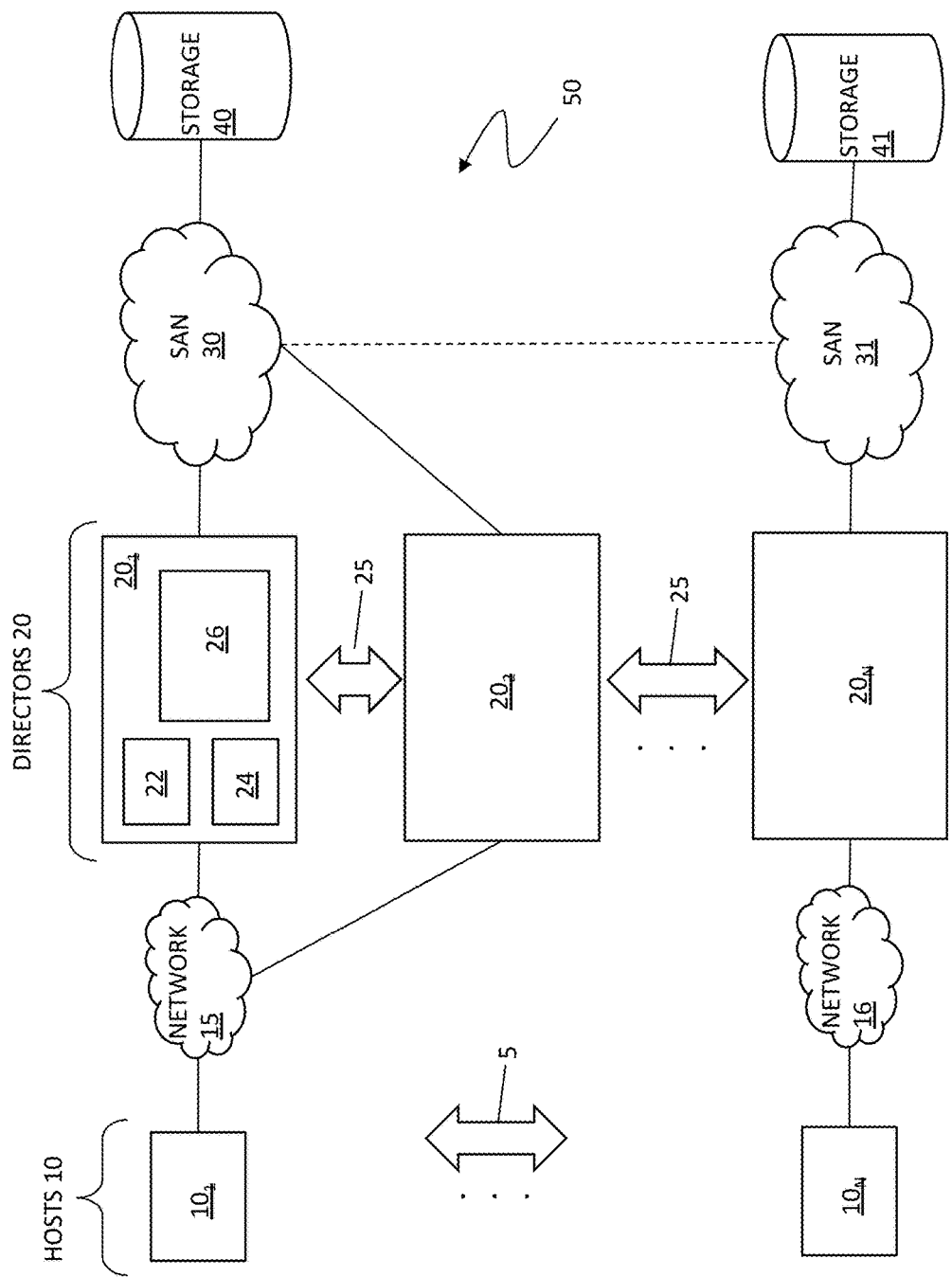
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 ($10_1$ to $10_N$) are communicably coupled with a plurality of directors 20 ($20_1$, $20_2$ to $20_N$). Each of the directors 20 may include a processor (CPU) component 22, such as a microprocessor or other intelligence module, a cache component 24 (e.g., RAM cache), an instance of a distributed cache manager 26 and/or other local storage and communication ports. In general, "N" is used herein to indicate an indefinite plurality, so that the number "N" when referred to one component does not necessarily equal the number "N" of a different component. For example, the number of hosts 10 may or may not equal the number of directors 20 in FIG. 1. Cache memory may generally be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another. It is also noted that in various embodiments the networks 15, 16 may be combined with the SAN networks 30, 31.

Each of the directors 20 may also include, or be communicably coupled with, one or more file systems, such as a virtual machine file system (VMFS), a new technology file system (NTFS) and/or other appropriate file system, and may be communicably coupled with one or multiple storage resources 40, 41, each including one or more disk drives and/or other storage volumes, over one or more storage area networks (SAN) 30, 31, and/or other appropriate network, such as a LAN, WAN, etc. The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16. Several of the directors 20 may be clustered together at one or more sites and in which the sites are geographically distant from one another. The system described herein may be used in connection with a VPLEX product produced by EMC Corporation of Hopkinton, Mass. and/or a vSphere product produced by VMware Inc. of Palo Alto, Calif. The system described herein may also be used in connection with an storage product produced by EMC Corporation, such as a Symmetrix product. Although principally discussed and illustrated in connection with embodiment for a distributed storage system, the system described herein may generally be used in connection with any appropriate distributed processing system.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks. However, it may be appreciated that a director may also be embodied as an intelligent fabric switch, a hub adapter and/or other appropriate network device and may also be implemented as a virtual machine, as further discussed elsewhere herein. Because Locality Conscious Directory Migration (LCDM) is applicable to databases, any suitable networked director may be configured to operate as an access node with distributed cache manager functionality. For example, a distributed cache manager may be run on one or more desktop computers and/or virtual machines with a network connection.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

As discussed in detail elsewhere herein, in a virtualized environment, a virtual center, an example of which may be a vCenter product produced by VMware, Inc. of Palo Alto, Calif., may provide a central point of control for managing, monitoring, provisioning and migrating virtual machines. Virtual centers may operate to control virtual machines in data centers and, for example, in connection with cloud computing. A virtual center may further include a virtual data center that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC of Richardson, Tex. It is noted that the term "Vblock" used herein may also be generally understood as including and referring to any appropriate software and/or component packages of a converged infrastructure product that provides network, compute and/or storage services for use in a virtualized computing environment. For example, other suitable types of converged infrastructure products may include EMC Corporation's VMAX SP and/or VSPEX products. Management of a Vblock and/or other appropriate type of converged infrastructure product may be provided by an appropriate software element. For example, EMC's Ionix Unified Infrastructure Manager (UIM) may be integrated with Vblock and provide a management console for management of the Vblock package.

Figure 2:
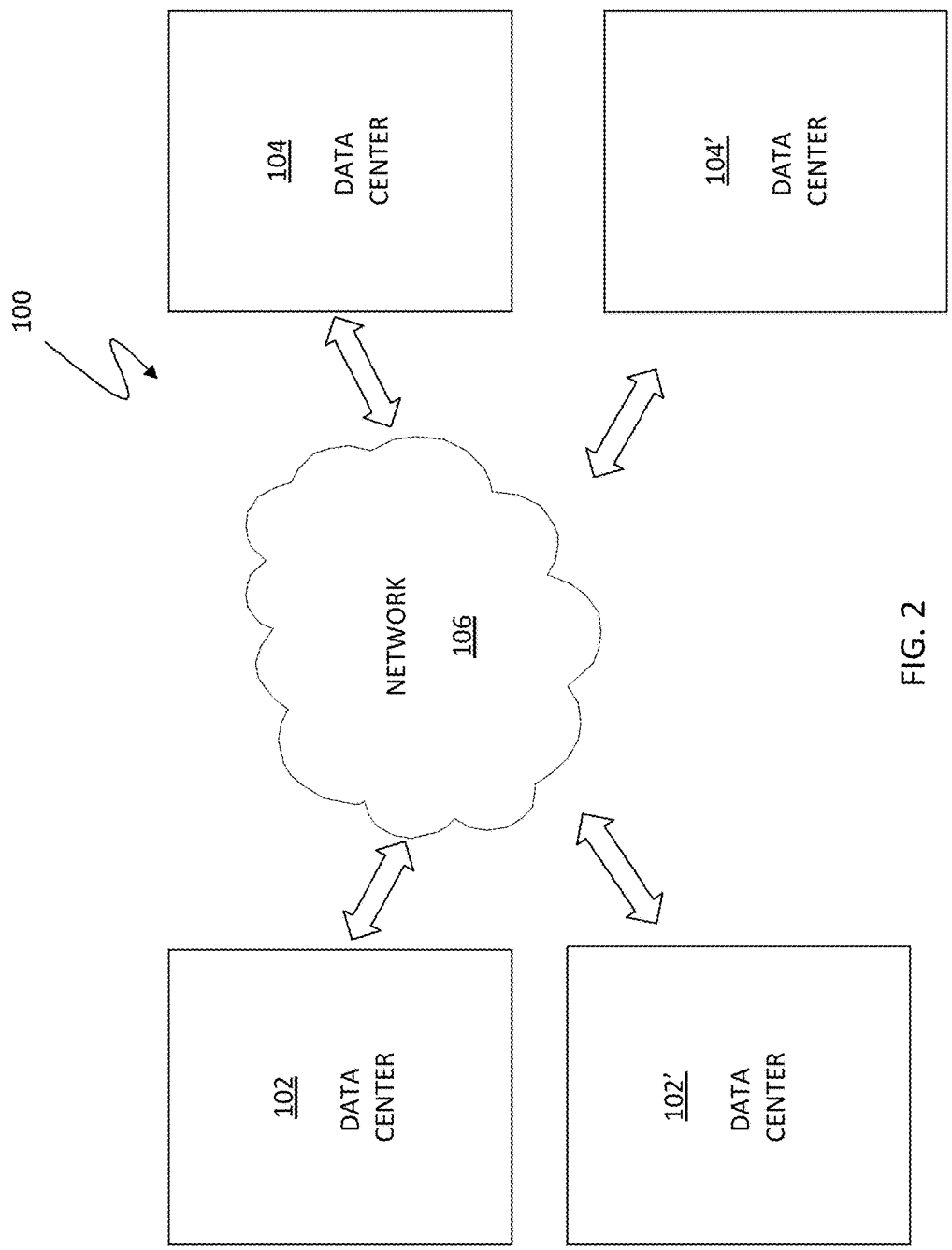
FIG. 2 is a schematic illustration showing a system that includes a plurality of data centers in communication via a network that may be used in accordance with an embodiment of the system described herein.

FIG. 2 is a schematic illustration showing a system 100 that includes a first data center 102 in communication with a second data center 104 via a network 106. Although the following embodiments are discussed principally in connection with data centers 102, 104 any number of additional data centers, represented as data centers 102', 104', may be also be used in connection with the system described herein. Each of the data centers 102, 104 may include a plurality of storage devices and processors (not shown in FIG. 2) for executing applications using a plurality of VMs and which may be controlled and/or managed in connection with one or more virtual centers and virtual data centers. The VMs may be configured using any appropriate server virtualization technology, such as that provided by VMware, Inc. of Palo Alto, Calif., including vSphere. VSphere is a suite of tools/applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 102, 104 may contain any number of processors and storage devices that are configured to provide the functionality described herein. In an embodiment herein, the storage devices may be Symmetrix storage arrays provided by EMC Corporation of Hopkinton, Mass. Other appropriate types of storage devices and different types of processing devices may also be used in connection with the system described herein. The data centers 102, 104 may be configured similarly to each other or may be configured differently. The network 106 may be any network or similar mechanism allowing data communication between the data centers 102, 104. In an embodiment herein, the network 106 may be the Internet and/or any other appropriate network and each of the data centers 102, 104 may be coupled thereto using any appropriate mechanism. In other embodiments, the network 106 may represent a direct connection (e.g., a physical connection) between the data centers 102, 104.

In various embodiments, VMs may be migrated from a source one of the data centers 102, 104 to a destination one of the data centers 102, 104. VMs may be transferred from one data site to another, including VM mobility over geographical distances, for example, for reasons of disaster avoidance, load balancing and testing, among other reasons. A product, such as EMC's VPLEX Metro and/or VPLEX Geo, may be used to enable the resources of disparate storage systems in dispersed data centers to be federated and/or coordinated and utilized as a single pool of virtual storage. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with provide for the ability to non-disruptively move many VMs. It is noted that the term "VPLEX" used herein may also generally be understood to refer to and include any appropriate software and/or component packages that provide for coordinating and/or federating resources of disparate systems as a single pool of virtual resources, in particular, for example, a single pool of virtual storage.

Figure 3:
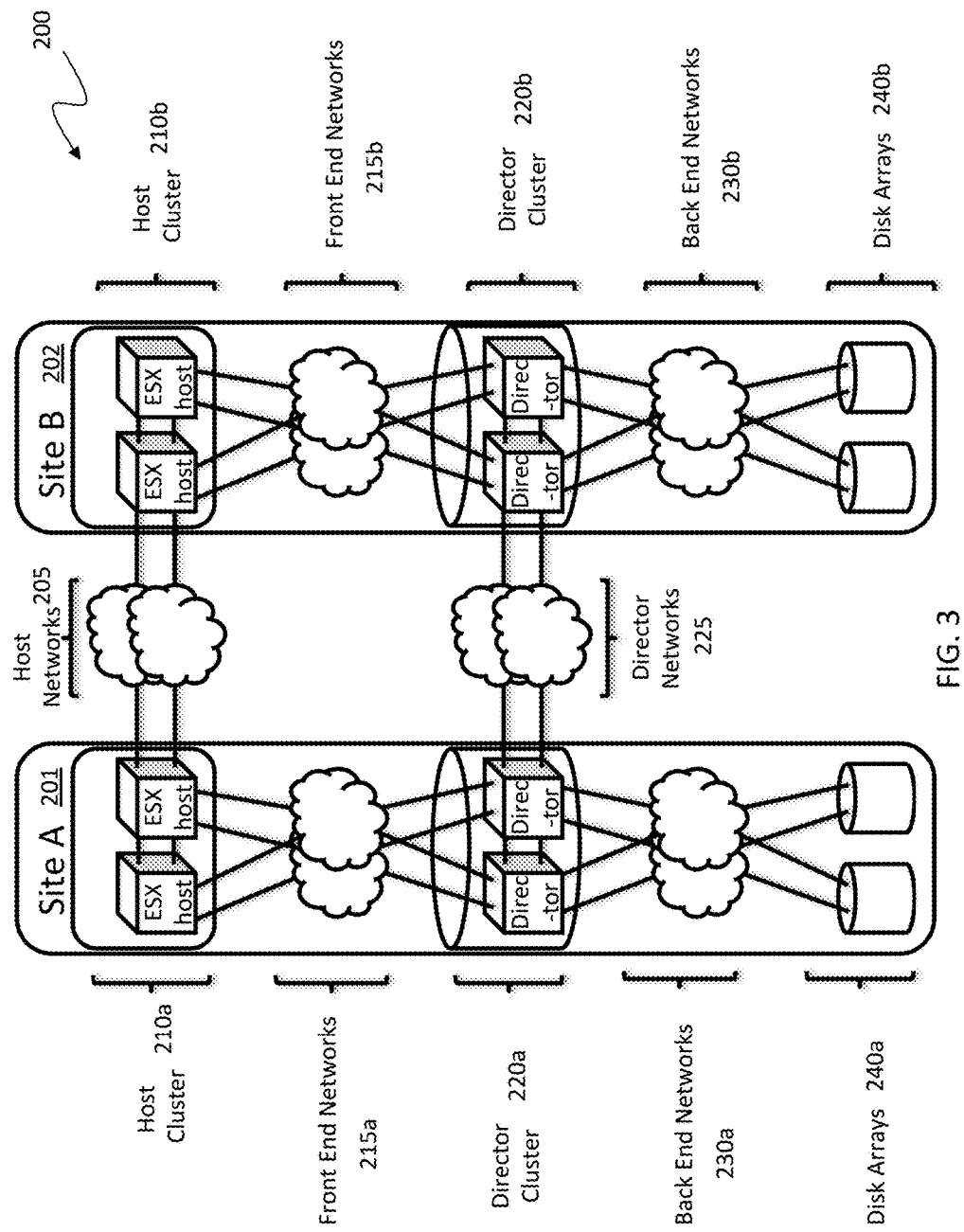
FIG. 3 is a schematic illustration showing a distributed storage system with multiple sites according to an embodiment of the system described herein.

FIG. 3 is a schematic illustration showing a distributed storage system 200 having multiple sites according to an embodiment of the system described herein. Although illustrated with two sites, Site A 201 and Site B 202, the system described herein may also operate in connection with additional sites. Although components are specifically identified with respect to Site A 201, Site B 202 (or any additional site) may also include the components discussed herein. The sites 201, 202 may include one or more hosts grouped in host clusters 210a,b, one or more directors grouped in director clusters 220a,b, and disk arrays 240a,b. Each host cluster 210a,b and director cluster 220a,b may each include software and/or other controllers or interfaces to control or administer operations in connection with described functions of the hosts and directors. In an embodiment, each host cluster 210a,b may include hosts, such as ESX hosts, in a vSphere cluster and each director cluster 220a,b may include directors in a VPLEX cluster. It is noted that although ESX hosts and illustrated and discussed herein as examples, any appropriate host may be used in connection with the system described herein. Front end networks 215a,b may connect through host links to the host clusters 210a,b and through front end links to the director clusters 220a,b. One or more back end networks 230a,b may connect through back end links to the director clusters 220a,b and through array links to the disk arrays 240a,b. In an embodiment, the front and back end networks may be Fibre Channel networks. The front end networks 215a,b allow the hosts (or VMs running therein) to perform input/output (I/O) operations with the host clusters 210a,b, while the back end networks 230a,b allow the directors of the director clusters 220a,b to perform I/O on the disk arrays 240a,b. One or more host networks 205, such as vSphere Ethernet networks, connect the ESX hosts in host clusters 210a,b. One or more director networks 225 connect the directors of the director clusters 220a,b.

Various types of failures, including network failures within a cluster, may result in behaviors that are further discussed elsewhere herein. It should be noted that the host cluster 210a,b (e.g., vSphere cluster) may be connected in such a way that VMs can keep their network (e.g., IP, FC, IB) addresses when migrating between clusters (for example, by means of a vLan or an open vSwitch). In an embodiment, VPLEX may be used and configured to expose one or more distributed volumes from both VPLEX director clusters. A VMFS may be created on top of these distributed volumes allowing VMs that migrate between the sites to see the same file system in either site. It is also noted that, as illustrated and according to various embodiments, each site 201, 202 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired.

I/O access may be provided to distributed volumes in an active/active system with two sites separated by an asynchronous latency. For asynchronous operation, a write operation to cluster at a remote site may be acknowledged as soon as a protection copy is made within the cluster. Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the dirty data between the clusters.

The above operations may work as long as the inter-cluster network is available. If the inter-cluster link fails, both clusters may contain dirty data that is unknown by the respective remote clusters. As a consequence of this failure, the director cluster may roll-back the image of the data to a write order consistent point. In other words, the director cluster may roll-back the image of the data to a point where it knows the data that is available on both clusters, or to a time where the write data was exchanged between both sites. The director cluster may also guarantee roll-back to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. Known techniques may provide write order consistency by grouping writes in what are called deltas and providing the consistency on a delta boundary basis. Reference is made to U.S. Pat. No. 7,475,207 to Bromling et al., entitled "Maintaining Write Order Fidelity on a Multi-Writer System," that discloses a system for maintaining write order fidelity (WOF) for totally active storage system implementations using WOF groups and including application to features such as point-in-time snapshots and continuous data protection, and to U.S. Pat. No. 7,054,883 to Meiri et al., entitled "Virtual Ordered Writes for Multiple Storage Devices," that discloses features for ordering data writes among groups of storage devices. The above-noted references are incorporated herein by reference.

Suspend/resume migration processing may involve suspending a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together. To know when the synchronization of VPLEX's dirty cache is finished, the customer may map the VMFS to a distributed volume.

Failures may also occur when a VM is migrated while performing I/O operations. In an example, the migration of a VM during I/O operations may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussion of specific system behaviors in connection with different types of failure scenarios, reference is made to U.S. Pat. No. 8,667,490 B1 to van der Goot, entitled "Active/Active Storage and Virtual Machine Mobility Over Asynchronous Distances," which is incorporated herein by reference.

Figure 4:
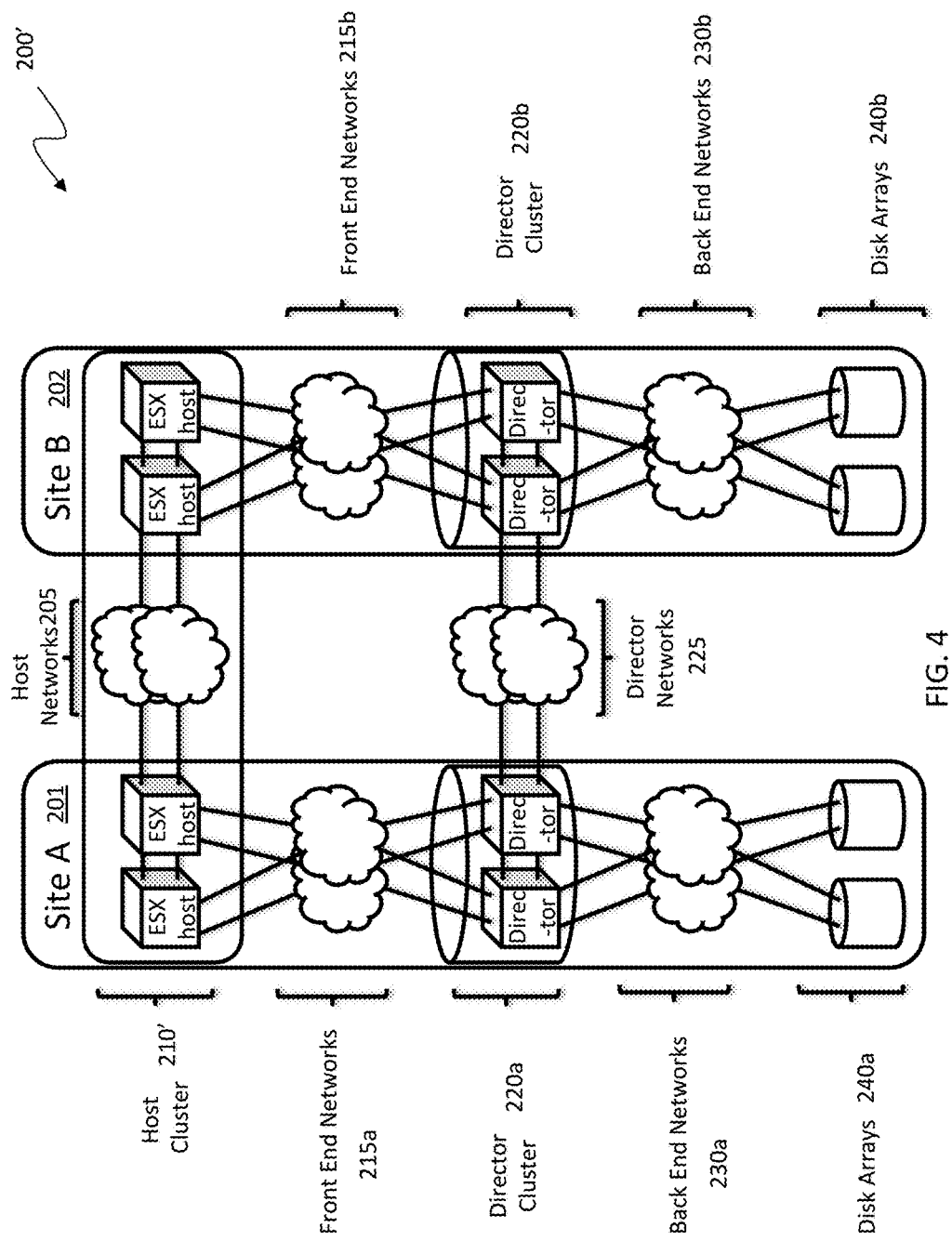
FIGS. 4 and 5 show alternative configurations of distributed storage systems that may be used in accordance with embodiments of the system described herein.
Figure 5:
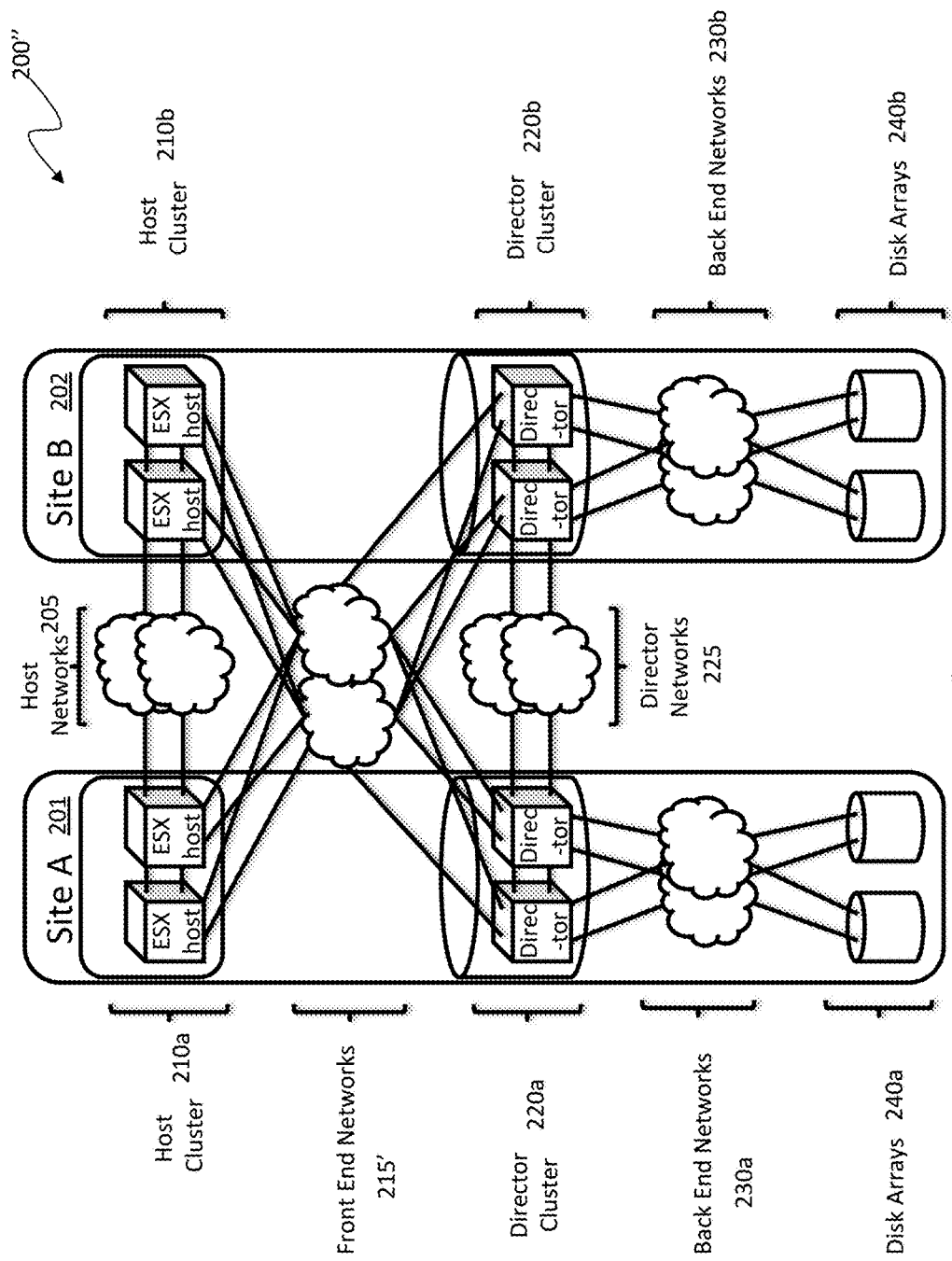

FIGS. 4 and 5 show alternative configurations for distributed storage systems that may be used in accordance with embodiments of the system described herein. In FIG. 4, a distributed storage system 200' is shown that includes a host cluster 210' as a distributed processing layer operating across the multiple sites 201, 202 and otherwise having elements like that discussed elsewhere herein. In FIG. 5, a distributed storage system 200" is shown in which the front end networks 215' are shown operating as an external network accessed by each of the sites 201, 202 and otherwise having elements like that discussed elsewhere herein.

Figure 6:
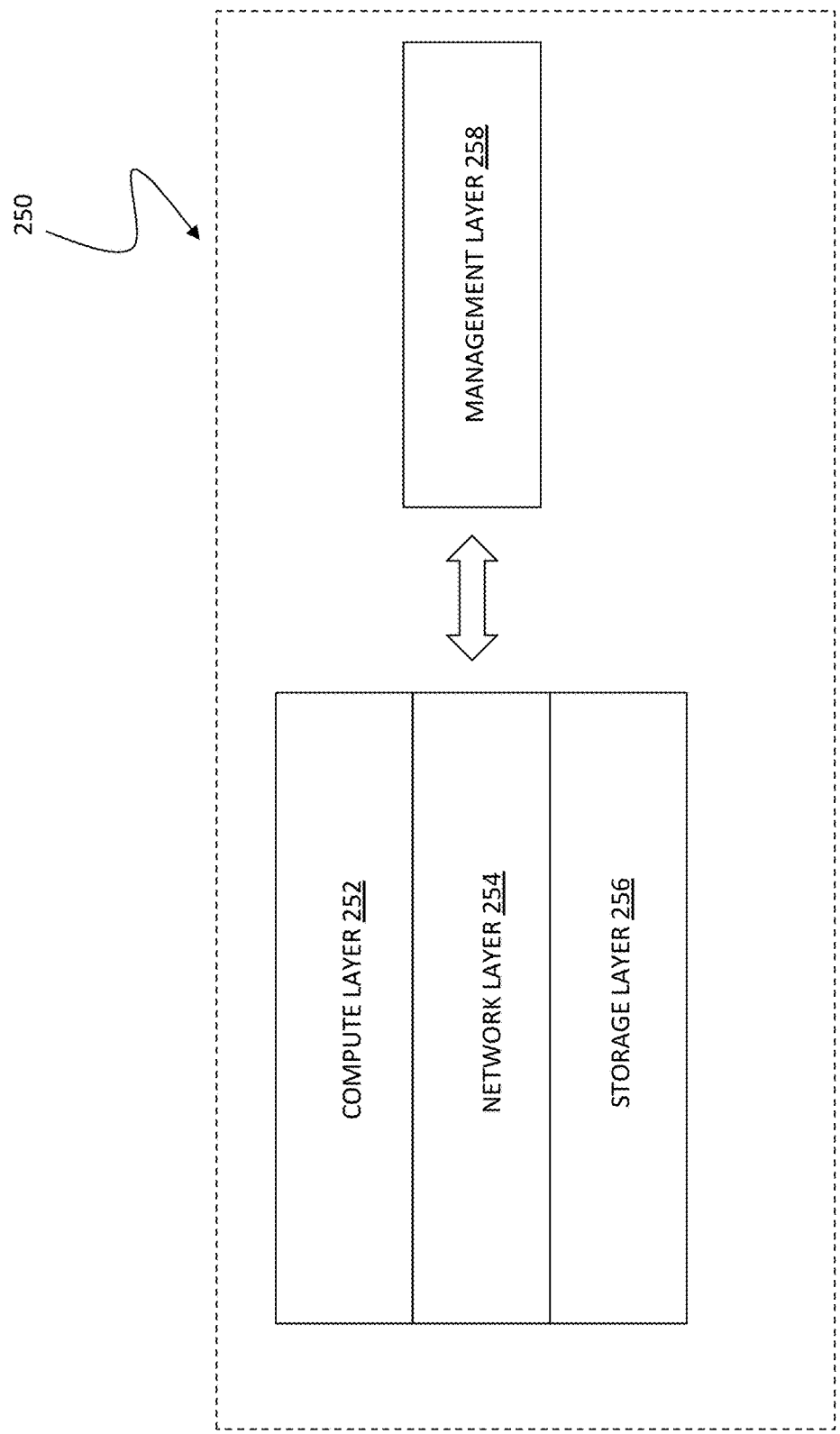
FIG. 6 shows an exemplary cloud computing system that may be used in connection with various embodiments of the system described herein in a manner similar to that discussed herein in connection with other types of distributed processing systems.

FIG. 6 shows an exemplary cloud computing system 250 that may be used in connection with various embodiments of the system described herein in a manner similar to that discussed herein in connection with other types of distributed processing systems. The system 250 may include a compute layer 252, a network layer 254, a storage layer 256 and/or a management layer 258. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute 252 and storage 256 layers within systems and/or between multiple cloud computing systems and to the client or customer network. The management layer 258 may provide one or more components used to manage one or more of the layers 252, 254 and/or 256. In an embodiment, the management layer 258 may include EMC Corporation's Unified Infrastructure Manager (UIM).

Figure 7:
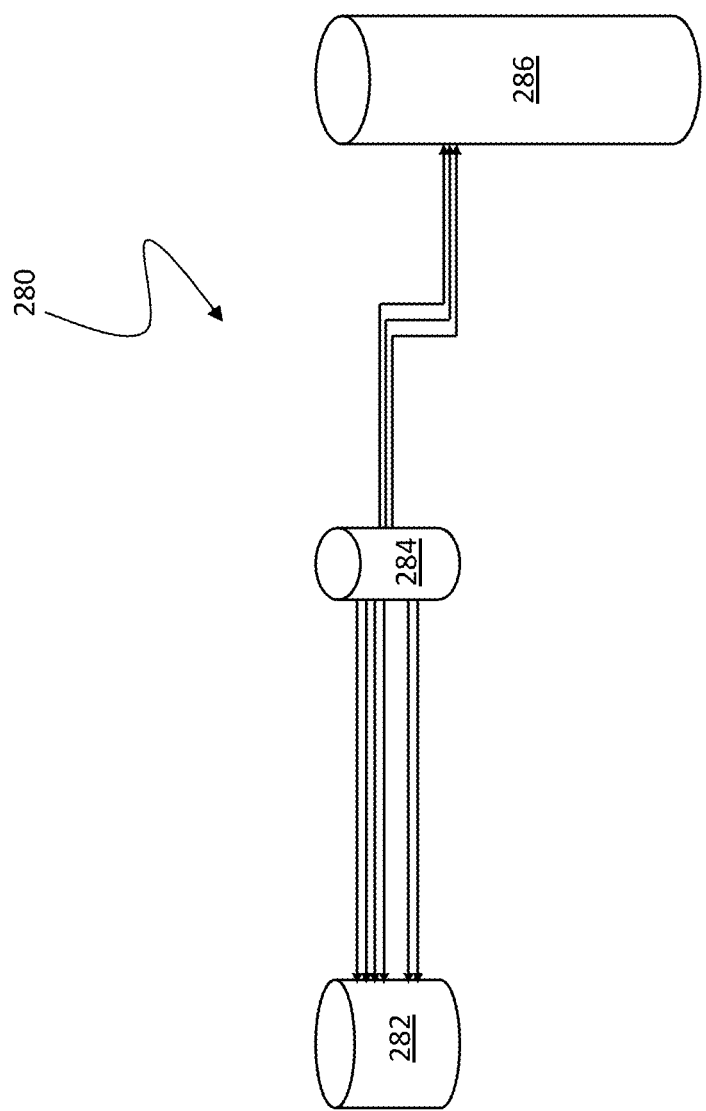
FIG. 7 is a schematic diagram showing a storage device, a point-in-time copy device, and a journal (or log) device that may be used in connection with an embodiment of the system described herein.

FIG. 7 is a schematic diagram 280 showing a logical or physical storage device 282, a point-in-time copy device 284, such as a snapshot copy device and/or other appropriate point-in-time copy device, and a journal (or log) device 286 that may be used in connection with an embodiment of the system described herein. The storage device 282 may be implemented using any appropriate storage device mechanism, such as logical or physical storage devices used on a Symmetrix and/or VPLEX product provided by EMC Corporation, and used to access corresponding physical storage disks. Similarly, the point-in-time copy device 284 may be any device that can provide point-in-time copy functionality for the storage device 282. As discussed herein, the point-in-time copy device 284 may provide a point in time copy of all or a portion of the storage device 282. In various embodiments, the point-in-time copy device 284 may be incorporated in the storage device 282 and/or may be located separately from the storage device 282. In an embodiment, a host coupled to a storage device that accesses the point-in-time copy device 284 may access the point-in-time copy device 284 in the same way that the host would access the storage device 282. However, the point-in-time copy device 284 does not contain any track data from the storage device 282. Instead, the point-in-time copy device 284 includes a plurality of table entries that point to tracks on either the storage device 282 or the journal device 286.

In an embodiment, when the point-in-time copy device 284 is established (e.g., when a point in time copy is made of the storage device 282), the point-in-time copy device 284 includes appropriate table entries that, at the time of establishment, point to tracks of the storage device 282. A host accessing the point-in-time copy device 284 to read a track would read the appropriate track from the storage device 282 based on the table entry of the point-in-time copy device 284 pointing to the track of the storage device 282.

After the point-in-time copy device 284 has been established, it is possible for a host to write data to the storage device 282. In that case, the previous data that was stored on the storage device 282 is copied to the journal device 286, for example, to an undo log of the journal device 286, as further discussed elsewhere herein, and the table entries of the point-in-time copy device 284 that previously pointed to tracks of the storage device 282 would be modified to point to the new tracks of the journal device 286 to which the data had been copied. Thus, a host accessing the point-in-time copy device 284 would read either tracks from the storage device 282 that have not changed since the point-in-time copy device 284 was established or, alternatively, would read corresponding tracks from the journal device 286 that contain data copied from the storage device 282 after the point-in-time copy device 284 was established.

In an embodiment, hosts would not have direct access to the journal device 286. That is, the journal device 286 may be used exclusively in connection with the point-in-time copy device 284 (and possibly other point-in-time copy devices). In addition, for an embodiment described herein, the storage device 282, the point-in-time copy device 284, and the journal device 286 may be provided on a single storage device. However, it is also possible to have portions of one or more of the storage device 282, the point-in-time copy device 284, and/or the journal device 286 provided on separate storage devices that are appropriately interconnected. The journal device 286, and/or other journal devices discussed herein, may be provided by a pool of journal devices that are managed by the storage device and/or other controller coupled to the SAN. In that case, as a point-in-time copy device requires additional tracks of a journal device, the point-in-time copy device would cause more journal device storage to be created (in the form of more tracks for an existing journal device or a new journal device) using the journal device pool mechanism. Pooling storage device resources in this manner is known in the art. Other techniques that do not use pooling may be used to provide journal device storage.

It is noted that the system described herein may be used with data structures and copy mechanisms other than tables and/or pointers to tracks discussed, for example, in connection with snapshots and/or other point-in-time copies. For example, the system described herein may also operate in connection with use of clones and/or deep copy backups automatically synchronized between data and metadata. Accordingly, the system described herein may be applied to any appropriate point-in-time copy processing systems and techniques, and it should be understood that the discussions herein with respect to the creation and use of snapshots, and the devices thereof, may be equally applied to the use of any appropriate point-in-time image used for point-in-time copy processes in connection with protection of data and configuration metadata that enable the rolling back/forward of a storage system using the point-in-time images of the data and configuration metadata according to the system described herein.

It is noted that to make use of VM snapshots and data storage snapshots, a boot up (or spin up) process is performed on the VM. Specifically, to make use of a VM snapshot, a management layer, such as a hypervisor, of the storage device running the VM boots up (or spins up) a VM copy and loads the VM snapshot before the VM snapshot can run. To make use of a data storage snapshot, the hypervisor running the VM boots-up a VM snapshot taken at the time of taking the data storage snapshot, in order to ensure consistency between the VM snapshot image and the data storage image. In both cases, the VM goes through a boot-up process before the VM can instantiate an application rooted in the snapshot. Thus, the time spent waiting on the boot-up process is spent at the expense of application availability.

Figure 8:
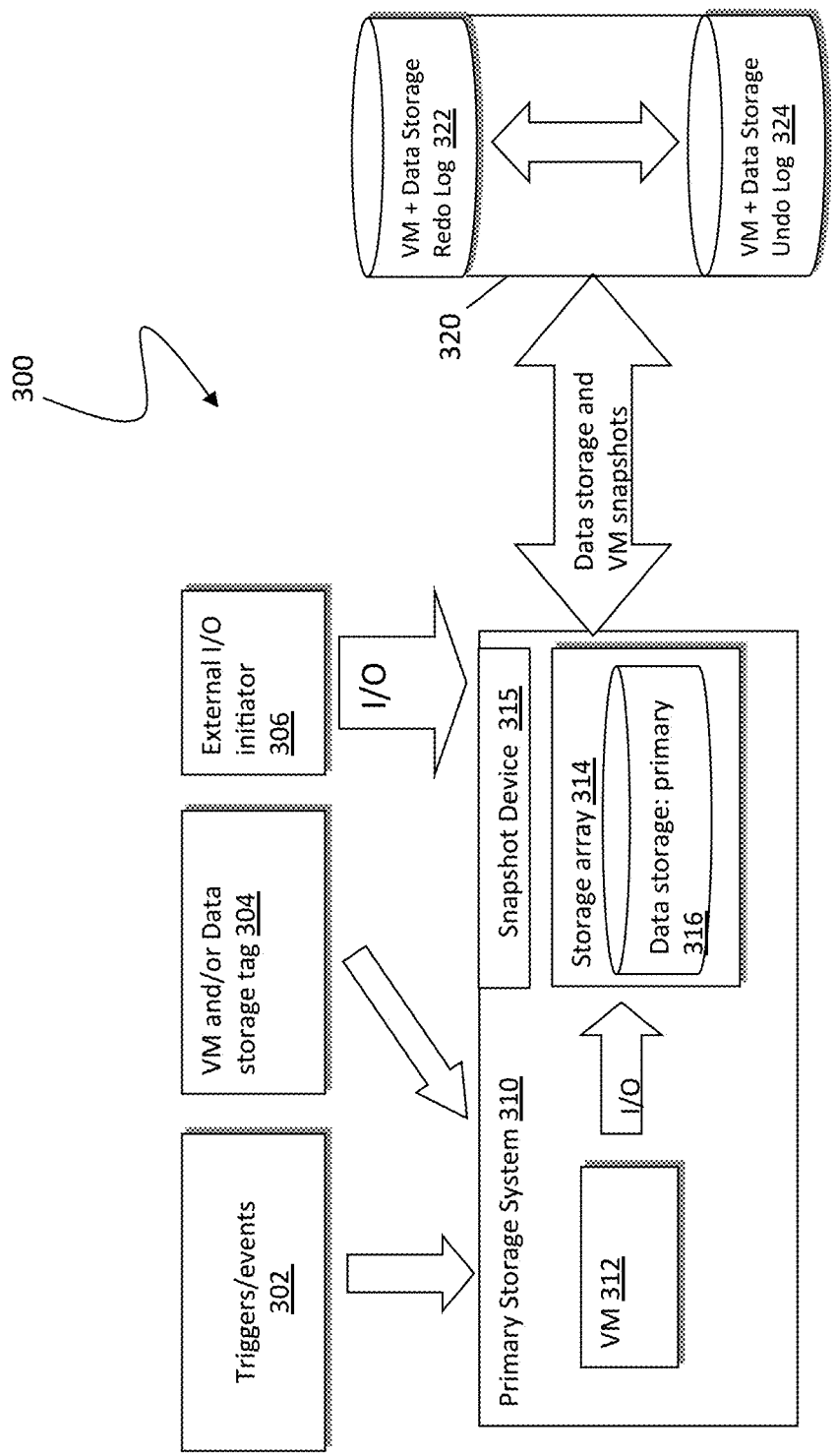
FIG. 8 is a schematic illustration showing a snapshot management system that may be used in connection with an embodiment of the system described herein.

FIG. 8 is a schematic illustration showing a snapshot management system 300 using VM operation and/or array data streams that may be be used in connection with an embodiment of the system described herein. A storage system 310 may include a VM 312 performing I/O operations on a data storage array 314 with primary data storage 316. Although one VM 312 is shown, the system described herein may operate in connection with more than one VM and, further, although the VM 312 is shown as part of the storage system 310, in other embodiments, the VM 312 may be located on a separate device. In an embodiment, the storage system 310 may be a system in which the VM 312 may be a VM actively running at a data center or other component of a storage system. For an VM, an operating system running on the VM does not need to be restarted in connection with the system described herein. Accordingly, embodiments of the system described herein, may enable modifying the VM state to a previous point-in-time while the VM is running and/or freezing the VM, rolling back or forward using stored point-in-time images (snapshots), and resuming operation of the VM. Although the storage system 310 is shown as a unit, in various embodiments, the components of the storage system 310 may operate in connection with a network and include cloud processing features and functions. The VM 312 may perform I/O operations on the data storage array 314 that may include primary data storage. As further discussed elsewhere herein, the system described herein may also operate in connection with data replication, in which case one or more data storage arrays may provide for primary and replica (e.g., backup) data storage.

A snapshot device 315 obtains the snapshots of both the data storage in the data storage array 314 and the state of the VM 312 and creates one or more snapshot images of the data storage and VM. The snapshot device 315 is shown as a component of the storage system 310; however, in other embodiments, the snapshot device 315 may be a separate device from the storage system 310. A trigger/event 302 is shown as an input to the storage system 310. The trigger may, for example, be a user action, a command, a result of a I/O operation or failure condition and/or any other appropriate trigger that triggers the obtaining of VM and/or data storage snapshots according to the system described herein. As illustrated, a VM and/or data storage tag 304 may be applied to each VM and/or data storage snapshot. The tag 304 is shown as an input to the system 310 and may be generated by a separate device; however, in other embodiments, the storage system 310 itself may generate and apply the tag 304. In an embodiment, the tag 304 may be a VM and/or a data storage continuous snapshotting tag.

A journal (or log) device 320 is shown that may include database components for both redo 322 and/or undo 324 journal logs. As illustrated, according to the system described herein, the one or more journal logs (redo 322 and/or undo 324) of the journal device 320 may each store the journal entries for both the VM snapshots and the data storage snapshots as one or more snapshot images resulting from the VM and/or data storage snapshot streams. It is noted that although one VM is shown and principally described, the VM and/or data storage snapshots may include all associated VMs of a data storage array, which may be more than one VM. With a combined VM and data storage image, rolling back (or forward) is provided concurrently in a coordinated fashion such that the system presents a combined existence/history of the VM and data storage array using the one or more snapshot images.

It is noted that I/O operations may be performed on the storage array 314 from an external I/O initiator 306. Such I/O operations may or may not be triggers for VM and/or data storage snapshot processing according to the system described herein. In the case of an I/O operation from the external I/O initiator 306, the state of the data storage of the storage array 314 reflects the I/O operation, which would be included in the next triggered VM and data storage snapshot according to the system described herein.

In various embodiments, the system described herein enables the log(s) 322, 324 of the journal device 320 to absorb log writes synchronously or asynchronously. In an embodiment in connection with asynchronous operation, the system described herein may be used in connection with asynchronous technologies such as VPLEX/Async by EMC Corporation of Hopkinton, Mass. Since synchronization of the streams is provided by the unifying of the multiple VM and I/O streams, including the VM operations, I/O operations and VM trigger information, although the journal entries may be written asynchronously from the actual obtaining of the VM and data storage snapshots, the snapshots remain synchronized when the log writes are later (asynchronously) written to the logs 322, 324. This may be useful to minimize the impact of snapshotting operations on the running VM, as VM operations are timing sensitive.

In an embodiment, the system described herein may provide for unifying the streams of I/O, external VM snapshot triggers and VM internal operations into one in connection with providing for snapshotting of both the data storage of a storage system and one or more associated VMs over time. It is noted that the system described herein may operate in connection with one VM and multiple data storage devices associated therewith. The system described herein thereby allows recording undo and redo journals for all the streams substantially simultaneously. Accordingly, in an embodiment of the system described herein, snapshots for data storage and all associated VMs may be unified in response to one or more triggers. A tag of the unified snapshots may therefore automatically refer to a point-in-time of both the one or more VMs and array data. For further discussion of unified VM and data storage snapshots, and uses thereof, references is made to U.S. patent application Ser. No. 13/741,644 to Salamon et al., filed Jan. 15, 2013, entitled "Unified Virtual Machine and Data Storage Snapshots," which is incorporated herein by reference. Reference is also made to U.S. Pat. No. 8,682,852 B1 to Salamon et al., entitled "Asymmetric Asynchronous Mirroring for High Availability," which is incorporated herein by reference.

In other embodiments, it is noted that the system described herein may be used in connection with other snapshotting systems. For example, the system described herein may be used in connection with systems utilizing independent VM and data storage snapshots in circumstances where a unified roll-back of both VM and data storage is not required and/or desired. In such circumstances, the system described herein may be used in connection with the independent roll-back or roll-forward of the VM and/or the data storage. For further discussion, reference is made, for example, to U.S. patent application Ser. No. 13/340,958 to Nickurak et al., filed Dec. 30, 2011, entitled "Continuous Protection of Data and Storage Management Configuration," which is incorporated herein by reference, that discloses example systems and techniques for synchronizing roll-back of the data on the storage array with roll-back to prior VM states according to storage configuration metadata. This reference provides that synchronization may be provided through the use of tags and/or other type of synchronization information for both the data snapshot streams and for the VM configuration metadata snapshot streams. The tags may be attached to the data and configuration streams as the streams are formed and the configuration snapshot stream and the data snapshot stream may be independently separate-able by a user, even though the streams may be synchronized by default, allowing for independent roll-back and roll-forward of data storage or configuration metadata states.

Figure 9:
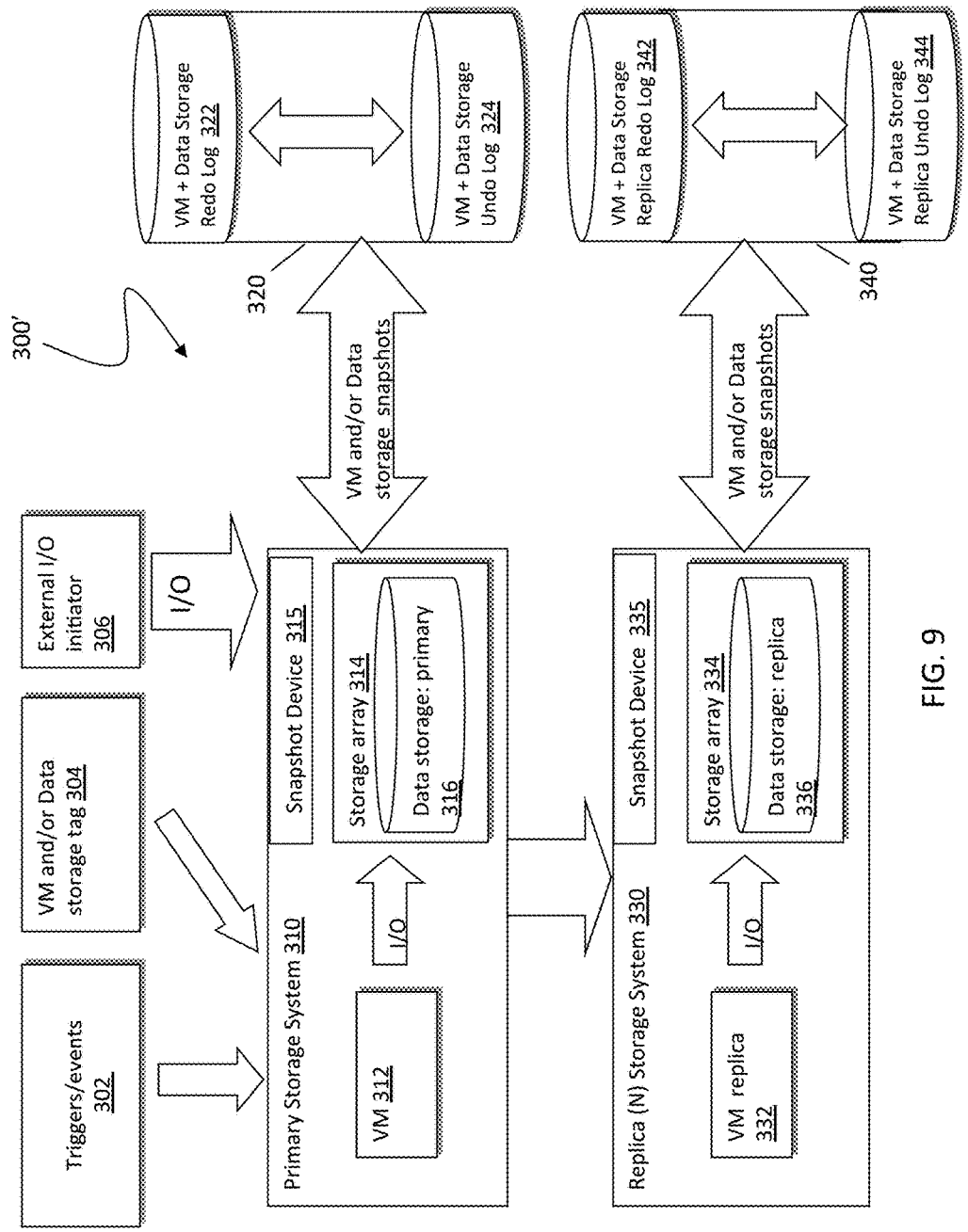
FIG. 9 is a schematic illustration of a snapshot management system further including additional (N) replica storage systems that may be used in connection with an embodiment of the system described herein.

FIG. 9 is a schematic illustration of a snapshot management system 300', like the snapshot management system 300, but further including additional (N) replica storage systems. One or more (N) replica storage systems 330 may include a VM replica 332 and storage array 334 with replica data storage that may provide a replica storage system of the primary storage system 310. A snapshot device 335 creates VM and/or data storage snapshots, as further discussed elsewhere herein. As with the primary storage system 310, a write-ordered stream of one or more VM and/or data storage snapshots stored in a journal device 340 ensures that the replica storage system 330 is subject to continuous protection and is crash consistent. Note that one primary system can have multiple replica systems (1:N). This would allow for multiple active snapshots that may be running at different points in time.

An appropriate process may link and unlink the primary system to and from the replica system consistent with appropriate back-up processing for a system subject to data mirroring/replication. The VM and/or data storage snapshot stream between the two can be viewed as being implemented through replication. When the replication mode is write through/sync, crash consistency is ensured implicitly. When the storage array is in write back/async mode, in order to ensure crash consistency, additional coordination (e.g., through messaging) may be provided between the VM and the array/primary data storage to ensure that the flow to the replica storage system is cut off at delta set boundaries.

A stream of updates may be combined simultaneously from the primary VM and the primary data storage, into an undo log (and, on replay, a redo log). The replica redo and undo logs may be fed by the one or more snapshots. Upon a crash of the primary storage system 310, the replica storage system 330 may immediately continue from the last operation and state of the primary storage system 310 using the coordinated replica data storage 336 on the storage array 334.

The replica storage system 330 may make use of the combined VM and/or Data Storage Replica Redo/Undo Logs 342, 344 of the journal device 340 to instantiate one or more images from a previous point in time. This image may be simultaneously instantiated for both the VM and/or its data storage, through undo/backwards play of the operations stored in the undo log. During the backwards play of the undo log, the operations that were already mirrored by the primary system to replica system are recorded into the redo log of the latter, for later roll-forward. In an embodiment, in a data mirroring/replication system, the primary storage system 310 may still have its own pair of VM+Data Storage Primary Undo/Redo Logs of a journal device 320, since the roles of the primary storage system 310 and replica storage system 330 may be reversed, and/or interchangeable, on demand.

Techniques, such as by using VPLEX, may provide for metro/geo cluster storage which can be accessible in multiple sites, as further discussed elsewhere herein. Snapshots may be implemented for VPLEX by leveraging the snapshots in the backend array behind the VPLEX, e.g. where the data is written to the storage array, such as by using EMC's ViPR product that is a software-defined storage product that abstracts storage from disparate arrays into a single pool of storage capacity. Approaches include creating a snapshot only on one site of the cluster and/or suspending I/Os on all the sites of the metro/geo cluster and creating snapshots simultaneously on all the storage arrays. These techniques, however, may suffer certain disadvantages in terms of timeliness of snapshot consistency and/or in delays of system operations.

According to the system described herein, it is provided that backend array-based snapshots may be created separately on each site of a cluster, and then the snapshots fixed so as to be consistent and/or otherwise identical among the plurality of sites. The system described herein advantageously allows creation of a consistent cluster-wide snapshot with minimal or no I/O delays. In an embodiment, the system described herein provides for use of a change tracker that tracks the metadata of all the I/Os incoming to the volumes being snapped. When the system wants to create consistent snapshots on all sites, the change tracker is activated on each site separately for the volumes being snapped. A snapshot is then created on each of the cluster sites/backend storage arrays separately. The change trackers are then ordered to stop tracking. A snapshot fixing procedure is then initiated.

For the snapshot fixing procedure, assume there are two sites A and B and it is determined that the snapshot is to have the data captured in site A. The change trackers are merged from sites B and site A into a list of changes in site B, and then all the marked locations are copied from the snapshot created at site A to the snapshot created at site B. After this merge, the snapshot created at site A and the snapshot created at site B may be identical. In various embodiments, the system described herein may also be applied in situations where there are more than two sites. It is noted that, in various embodiments, the change trackers may include separate trackers at each site and/or may include, in at least some cases involving synchronous operations, a single tracker that may have one or more components distributed across multiple sites.

Figure 10:
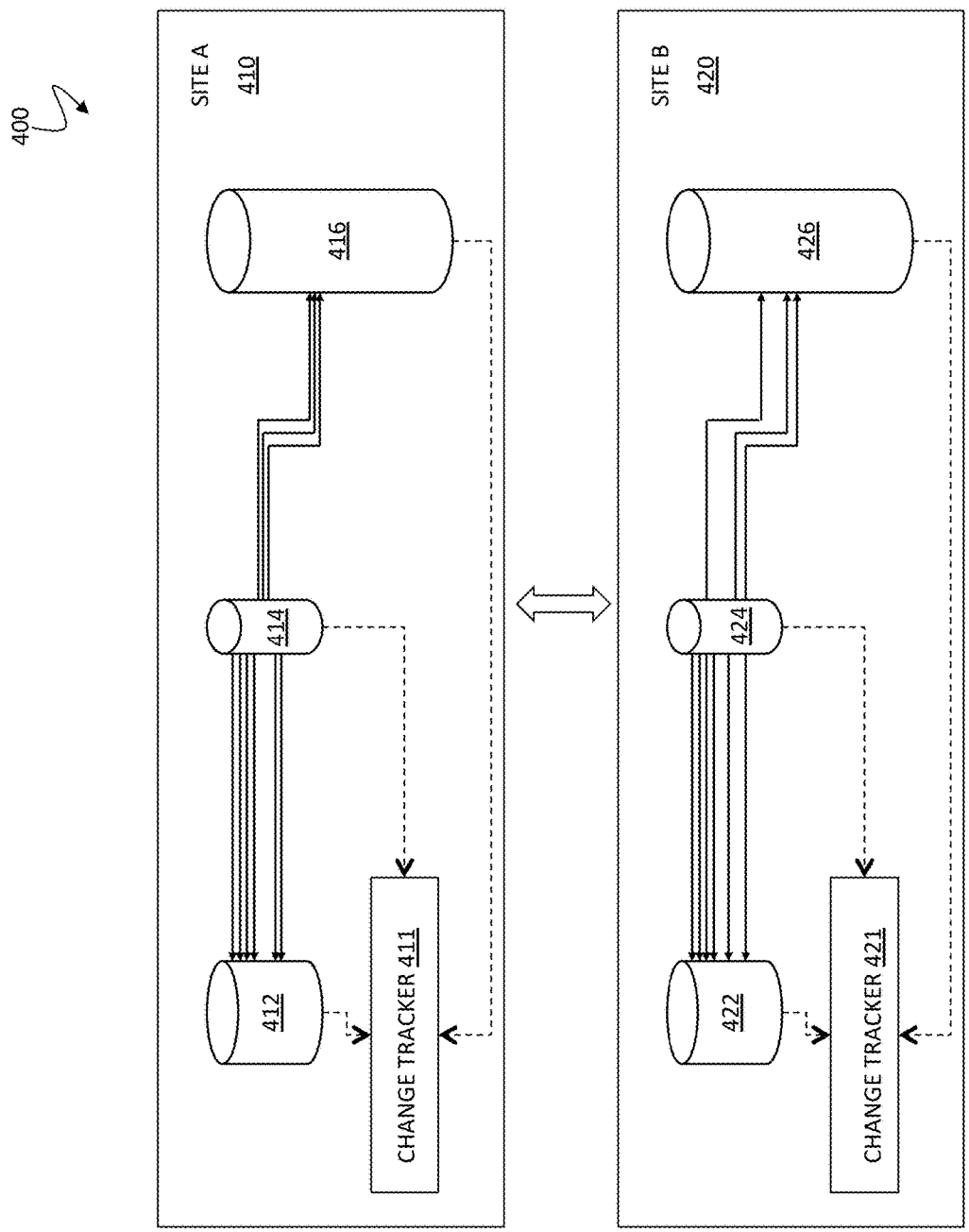
FIG. 10 is a schematic illustration showing a consistent snapshot system according to an embodiment of the system described herein.

FIG. 10 is a schematic illustration showing a consistent snapshot system 400 according to an embodiment of the system described herein. The system 400 includes a Site A 410 and a Site B 420. The Site A 410 includes at least one storage device 412 having one or more storage volumes, a snapshot device 414 (and/or other appropriate point-in-time copy device) and a journal (or log) device 416. The storage device 412 may be implemented using any appropriate storage device mechanism, such as logical or physical storage devices used in connection with a VPLEX product provided by EMC Corporation, and used to access a storage array. Similarly, the snapshot device 414 may be any device that can provide snapshot functionality for the storage device 412. As discussed herein, the snapshot device 414 may provide a snapshot of all or a portion of the storage device 412. In various embodiments, the snapshot device 414 may be incorporated in the storage device 412 and/or may be located separately from the storage device 412. The snapshot device 414 includes a plurality of table entries that point to tracks on either the storage device 412 or the journal device 416. In various embodiments, the system described herein may be used in connection with any appropriate snapshot technologies, including, for example, copy on first write snapshot processes and/or redirect on write snapshot processes which keep the primary and snapshot volumes on the same devices and write new data to new locations updating pointers.

Site B 420 may include a storage device 422, a snapshot device 424 and a journal device 426 that correspond in features and functions to the storage device 412, the snapshot device 414 and the journal device 416 discussed in connection with the Site A 410. However, as discussed herein, the contents of the respective components of the Site A 410 and Site B 420 may or may not be identical, as further discussed elsewhere herein.

Site A 410 may include a change tracker device 411 and Site B 420 may include a change tracker device 421. Each of the change tracker devices 411, 421 track the data, such as metadata, of all the I/Os incoming to the volumes being snapped on the storage devices 412, 422. The metadata of the I/Os being tracked may include location, size and volume information, among other metadata. Each of the change trackers 411, 421 is activated on each site separately for the volumes being snapped, and is activated prior to snapshots being created on each of the sites. The system then waits for open I/Os to be quiesced and/or flushed. It is noted that in connection with quiescing and/or flushing open I/Os, although not necessarily required, the system may, in some cases, temporarily suspend new I/Os for a short time, while, in other cases, the flush mechanism may include a period of wait time for acknowledgment that all open IOs were indeed flushed. It is further noted that, in various embodiments, the change trackers 411, 412 may include separate trackers at each site and/or may include, in at least some cases involving synchronous operations, a single tracker that may have one or more components distributed across multiple sites.

A snapshot is then created on each of the sites 410, 420 separately. After the snapshot is established at the snapshot device 414 (e.g., after snapshot is made of one or more volumes of the storage device 412), the snapshot device 414 includes appropriate table entries that, at the time of establishment, point to tracks of the storage device 412. After the snapshot has been established at the snapshot device 414, it is possible for a host to write data to the storage device 412. In that case, the previous data that was stored on the storage device 412 is copied to the journal device 416, for example, to an undo log of the journal device 416, as further discussed elsewhere herein, and the table entries of the snapshot device 414 that previously pointed to tracks of the storage device 412 would be modified to point to the new tracks of the journal device 416 to which the data had been copied. Thus, a host accessing the snapshot device 414 would read either tracks from the storage device 412 that have not changed since the snapshot device 414 was established or, alternatively, would read corresponding tracks from the journal device 416 that contain data copied from the storage device 412 after the snapshot device 414 was established. After the snapshots are created on each of the sites, the change trackers 411, 421 are then ordered to stop tracking. A snapshot fixing procedure is then initiated, as further discussed elsewhere herein.

Figure 11:
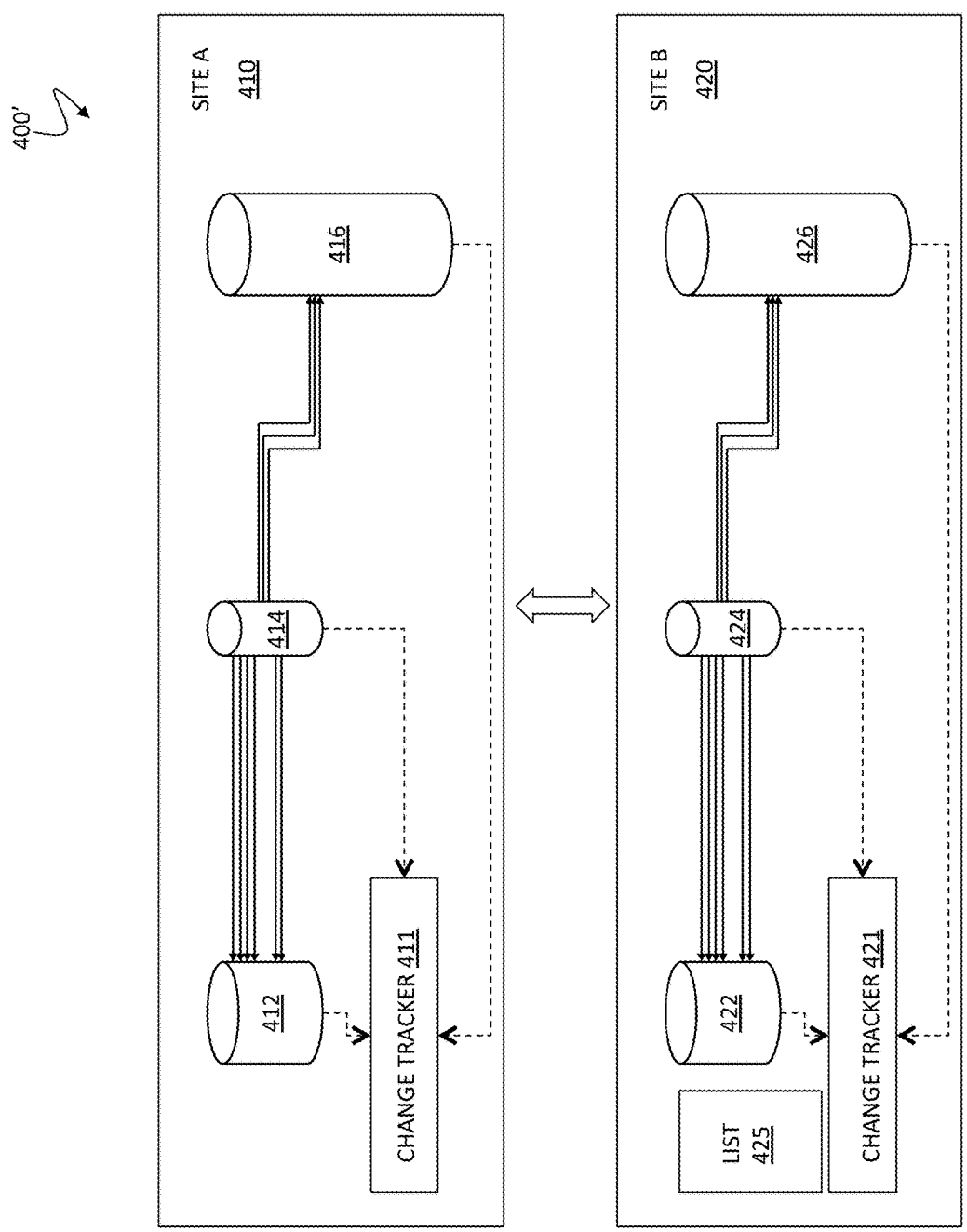
FIG. 11 is a schematic illustration showing an embodiment for the consistent snapshot system in connection with a snapshot fixing procedure according to an embodiment of the system described herein.

FIG. 11 is a schematic illustration showing an embodiment 400' for the consistent snapshot system, like the consistent snapshot system 400 as discussed above, in connection with a snapshot fixing procedure according to an embodiment of the system described herein. For the snapshot fixing procedure, a determination is made to select one of the sites as a target site. In an embodiment, among the two sites A 410 and B 420, it may be determined, for example, that the snapshot is to have the metadata captured in site A 410 for merging into site B 420 as the target site. Information of the change trackers 411, 412 is merged from site A and site B into a list of changes 425 in site B 420. All the marked locations according to the list of changes 425 are then copied from the snapshot created at site A to the snapshot created at site B to thereby modify the snapshot at site B to be a consistent snapshot. After this processing, the snapshot created at site A 410 and the snapshot created at site B 420 may be identical. Thereafter, the change trackers 411, 412 may be erased, and then restarted for subsequent use in connection with incoming I/Os to the sites 410, 420. It is also noted that if there are any failures during the processing in connection with the use of the change trackers, then an error message may be sent indicating unsuccessful processing. In various embodiments, the system described herein may also be applied and operate in situations where there are more than two sites.

Figure 12:
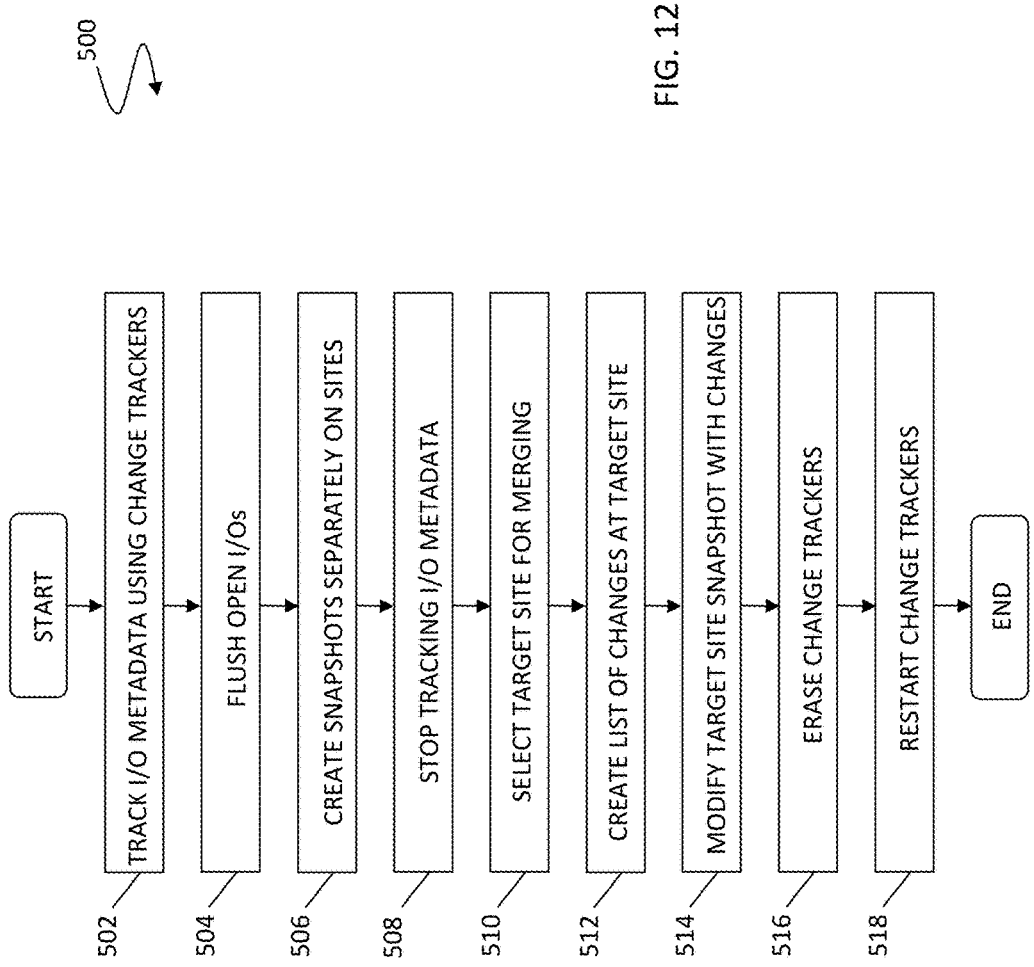
FIG. 12 is a flow diagram showing consistent snapshot processing according to an embodiment of the system described herein.

FIG. 12 is a flow diagram 500 showing consistent snapshot processing according to an embodiment of the system described herein. At a step 502, a change tracker is initiated and/or otherwise activated at each site of a plurality of sites that receive I/Os in connection with storing data on storage arrays. The change trackers may track metadata of the I/Os. After the step 502, at a step 504, open I/Os are quiesced and/or other flushed. In an embodiment, performance of this step may, in some cases, involve temporary suspension of new I/Os for a short time, while, in other cases, the flush mechanism may include a period of wait time for acknowledgment that all open IOs were indeed flushed. After the step 504, at a step 506, snapshots are created separately at each of the plurality of sites for all or at least a portion of volume(s) on one or more storage devices at the sites.

After the step 506, at a step 508, each of the change trackers on the plurality of sites is controlled to stop tracking the metadata of the I/Os. After the step 508, at a step 510, one of the sites is selected as a target site into which differences from other of the plurality of sites will be merged. After the step 510, at a step 512, information of the change trackers on each of the sites is merged into a list of changes in the target site. The list of changes thereby enables the target site to merge all data differentials from each of the plurality of sites. After the step 512, at a step 514, all the marked locations according to the list of changes are then copied from the snapshot(s) created at other site(s) to the snapshot created at target site, thereby modifying the snapshot at the target site into a consistent snapshot for all of the sites.

After the step 514, at a step 516, the change trackers at each of the plurality of sites may be erased. After the step 516, at a step 518, the change trackers may be restarted for subsequent use in connection with incoming I/Os to the plurality of sites. After the step 518, processing is complete for the iteration of the system being discussed. It is also further noted that error steps may be performed in connection with the flow chart 500 if any failure occurs during the consistent snapshot processing, and, in such case, may generate an error message indicating a unsuccessful snapshot consistency processing.

Although the system described herein has been discussed in connection with the use of tracks as a unit of data for certain purposes, it should be understood that the system described herein may be used with any appropriate units or structures of data, such as tracks, and further including, possibly, variable length units of data. It is also noted that one or more storage devices having components as described herein may, alone or in combination with other devices, provide an appropriate platform that executes any of the steps described herein. The system may operate with any snapshot mechanism not inconsistent therewith and/or with any other appropriate point-in-time copy mechanism.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of aspects of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for providing a consistent point-in-time copy of data, comprising:
   tracking information of input/outputs (I/Os) of data on each site of a plurality of sites each having at least one storage array;
   replicating data from at least one of the sites to at least one other ones of the sites;
   creating separate point-in-time copies of the data at each site of the plurality of sites using snapshots at each of the sites, wherein each of the snapshots preserves data from a corresponding storage location therefor in response to the storage location being overwritten using a change tracker device at each of the plurality of sites to track data corresponding to all incoming I/O operations at each of the storage devices;
   selecting one of the sites as a target site;
   suspending the change tracker device at each of the sites; and
   adjusting the snapshots at the target site after suspending the change tracker device to provide the consistent point-in-time copy of the data among the plurality of sites by modifying the data preserved at the snapshots at the target site according to differences between information of input/outputs of data tracked at the target site and information of input/outputs of data tracked at the other sites.

2. The method of claim 1, wherein the information of the I/Os is metadata of the I/Os.

3. The method according to claim 1, wherein adjusting the point-in-time copies of the data includes:
   stopping the tracking of the information of the I/Os; and
   merging the tracked information of the I/Os from each of the plurality of sites into the target site to create a list of changes at the target site corresponding to differences between information of input/outputs of data tracked at the target site and information of input/outputs of data tracked at the other sites.

4. The method of claim 3, wherein the information of the I/Os is tracked using at least one change tracker for the plurality of sites.

5. The method of claim 4, wherein the at least one change tracker includes separate change trackers at each site of the plurality of sites.

6. The method of claim 4, further comprising:
after modifying the point-in-time copy at the target site, erasing the at least one change tracker for the plurality of sites; and
after erasing the at least one change tracker, restarting the at least one change tracker to track information of further I/Os at each site.

7. The method of claim 1, further comprising:
before creating the point-in-time copies separately at each site, flushing open I/Os at each of the sites.

8. A non-transitory computer-readable medium storing software for providing a consistent point-in-time copy of data, the software comprising:
executable code that tracks information of input/outputs (I/Os) of data on each site of a plurality of sites each having at least one storage array;
executable code that replicates data from at least one of the sites to at least one other ones of the sites;
executable code that creates separate point-in-time copies of the data at each site of the plurality of sites using snapshots at each of the sites, wherein each of the snapshots preserves data from a corresponding storage location therefor in response to the storage location being overwritten using a change tracker device at each of the plurality of sites to track data corresponding to all incoming I/O operations at each of the storage devices;
executable code that selects one of the sites as a target site;
executable code that suspends the change tracker device at each of the sites; and
executable code that adjusts the snapshots at the target site while the change tracker device is suspended to provide the consistent point-in-time copy of the data among the plurality of sites by modifying the data preserved at the snapshots at the target site according to differences between information of input/outputs of data tracked at the target site and information of input/outputs of data tracked at the other sites.

9. The non-transitory computer-readable medium of claim 8, wherein the information of the I/Os is metadata of the I/Os.

10. The non-transitory computer-readable medium of claim 8, wherein the executable code that adjusts the point-in-time copies includes:
executable code that stops the tracking of the information of the I/Os; and
executable code that merges the tracked information of the I/Os from each of the plurality of sites into the target site to create a list of changes at the target site corresponding to differences between information of input/outputs of data tracked at the target site and information of input/outputs of data tracked at the other sites.

11. The non-transitory computer-readable medium of claim 10, wherein the information of the I/Os is tracked using at least one change tracker for the plurality of sites.

12. The non-transitory computer-readable medium of claim 11, wherein the at least one change tracker includes separate change trackers at each site of the plurality of sites.

13. The non-transitory computer-readable medium of claim 11, wherein the software further comprises:
executable code that, after the point-in-time copy is modified at the target site, erases the change tracker at each site of the plurality of sites; and
executable code that, after the change tracker is erased at each site, restarts the change tracker at each site to track information of further I/Os at each site.

14. The non-transitory computer-readable medium of claim 8, wherein the software further comprises:
executable code that, before the point-in-time copies are created separately at each site, flushes open I/Os at each of the sites.

15. A system, comprising:
a plurality of sites having storage arrays;
a non-transitory computer-readable medium storing software for providing a consistent point-in-time copy of data, the software including:
executable code that tracks information of input/outputs (I/Os) of data on each site of the plurality of sites;
executable code that replicates data from at least one of the sites to at least one other ones of the sites;
executable code that creates point-in-time copies of the data separately at each site of the plurality of sites using snapshots at each of the sites, wherein each of the snapshots preserves data from a corresponding storage location therefor in response to the storage location being overwritten using a change tracker device at each of the plurality of sites to track data corresponding to all incoming I/O operations at each of the storage devices;
executable code that selects one of the sites as a target site;
executable code that suspends the change tracker device at each of the sites; and
executable code that adjusts the point-in-time snapshot at the target site while the change tracker device is suspended to provide the consistent point-in-time copy of the data among the plurality of sites by modifying the data preserved at the snapshots at the target site according to differences between information of input/outputs of data tracked at the target site and information of input/outputs of data tracked at the other sites.

16. The system of claim 15, wherein the information of the I/Os is metadata of the I/Os.

17. The system of claim 15, wherein the executable code that adjusts the point-in-time copies includes:
executable code that stops the tracking of the information of the I/Os; and
executable code that merges the tracked information of the I/Os from each of the plurality of sites into the target site to create a list of changes at the target site corresponding to differences between information of input/outputs of data tracked at the target site and information of input/outputs of data tracked at the other sites.

18. The system of claim 17, wherein the information of the I/Os is tracked using at least one change tracker for the plurality of sites.

19. The system of claim 18, wherein the software further comprises:
executable code that, after the point-in-time copy is modified at the target site, erases the change tracker at each site of the plurality of sites; and
executable code that, after the change tracker is erased at each site, restarts the change tracker at each site to track information of further I/Os at each site.

20. The system of claim 15, wherein the software further comprises:
executable code that, before the point-in-time copies are created separately at each site, flushes open I/Os at each of the sites.

* * * * *